United States Patent
Geroult et al.

(12)

(10) Patent No.: US 6,216,754 B1
(45) Date of Patent: Apr. 17, 2001

(54) INFUSING APPARATUS

(75) Inventors: Marc Geroult, Alencon; Christian Bernard Jouatel, Radon, both of (FR)

(73) Assignee: Moulinex S.A., Paris (FR)

( * ) Notice: Subject to any disclaimer, the term of this patent is extended or adjusted under 35 U.S.C. 154(b) by 0 days.

(21) Appl. No.: 09/254,236

(22) PCT Filed: Aug. 18, 1997

(86) PCT No.: PCT/FR97/01496

§ 371 Date: Mar. 2, 1999

§ 102(e) Date: Mar. 2, 1999

(87) PCT Pub. No.: WO98/09558

PCT Pub. Date: Mar. 12, 1998

(30) Foreign Application Priority Data

Sep. 2, 1996 (FR) .................................................. 96 10682

(51) Int. Cl.⁷ .............................. A47J 31/50; A47G 19/14
(52) U.S. Cl. .......................... 141/350; 141/21; 222/470; 222/472; 222/475.1
(58) Field of Search ...................... 141/18, 21, 348–350; 222/470, 472–474, 475.1

(56) References Cited

U.S. PATENT DOCUMENTS

| 4,924,922 | 5/1990 | Johnson | 141/346 |
| 5,265,767 | 11/1993 | Gustafson | 222/144.5 |
| 5,779,102 | * | 7/1998 | Smith | 222/475.1 |

FOREIGN PATENT DOCUMENTS 44 28 471    2/1996  (DE) .

* cited by examiner

Primary Examiner—J. Casimer Jacyna
(74) Attorney, Agent, or Firm—Young & Thompson

(57) ABSTRACT

An infusing apparatus comprises a collecting spout capable of being fixed under the outlet aperture of an infusing chamber. The spout has a lid provided with an opening through which the infusion penetrates, and an obstructer of the opening for in particular keeping the infusion at an optimal temperature. Elements for actuating the obstructer are further provided for automatically releasing the opening by the action of a stop integral with the apparatus, when the spout is being fixed on the outlet aperture. The actuating elements are also capable of being manually controlled for releasing the opening and allowing the infusion collected in the spout to be extracted through the opening. The invention is useful for household electrical coffee-pots or teapots.

8 Claims, 4 Drawing Sheets

INFUSING APPARATUS

CROSS REFERENCE TO RELATED APPLICATION

This is the 35 USC 371 national stage of International application PCT/FR97/01496 filed on Aug. 18, 1997, which designates the United States of America.

FIELD OF THE INVENTION

The present invention relates to an infusion apparatus of the type comprising a server for collecting infusion, adapted to be placed below the outlet opening of an infusion chamber, said server having a cover provided with an opening through which the infusion flows, and a closure for said opening particularly to maintain the collective infusion at an optimum temperature, actuating means for the opening being moreover provided to open automatically the opening under the action of an abutment secured to the apparatus, during emplacement of the server below said outlet opening.

A particular field of use of the invention is that of electric household coffee makers or tea makers.

BACKGROUND OF THE INVENTION

In known infusion apparatus of the above type, the cover of the server is present in the form of a plug which can be screwed onto the edges of the central opening of the server. The plug comprises an opening, also centrally located, for the passage of the infusion from the infusion chamber toward the server. The closure of the central opening of the plug is constituted by a flap mounted movably in translation on the plug so as to bear against the opening of the edges from below the plug. When the server is emplaced on the apparatus, an abutment, generally in the form of the lower portion of the infusion chamber, bears against the actuating means of the flap so as to space, by a translatory movement, the flap from the opening, and to prevent the passage of the infusion into the server.

When the user desires to remove the collected infusion through the server, he must first unscrew the plug so as to leave a sufficient space between the plug and the edges of the server for the passage of the infusion.

A drawback of this type of apparatus is the complicated manipulation of the server.

Thus, the action of pouring the collected infusion into a cup or the like is often impaired, because the user must necessarily use his two hands, and must moreover take care not to unscrew the plug too much, lest he have too great a flow of infused liquid, or even the complete escape of the plug at the end of its path and all the mess this entails.

Moreover, the user must necessarily remember to screw back the plug if he wishes to keep the rest of the collected infusion at an optimum temperature, or again if he desires to replace the server on the machine.

On the other hand, in the case in which the server is of the insulated type, the glass lining is fragile and must not be subjected to any substantial axis force.

SUMMARY OF THE INVENTION

The object of the present invention is to provide an infusion apparatus which will be simple to use.

More precisely, an infusion apparatus according to the invention is characterized in that the actuating means of the closure are adapted also to be controlled manually so as to open the opening and to permit the removal of the infusion collected in the server, through said opening.

Thus, for an infusion apparatus according to the invention, the infusion passage, either from the infusion chamber to the server, or from the server to a receptacle of the cup type, is always carried out through the same opening, and is rendered possible by acting either automatically or manually on the common actuating means of the closure.

BRIEF DESCRIPTION OF THE DRAWINGS

The present invention, as well as the advantages which it provides, will be better understood from the following description, given with reference to the accompanying drawings, in which.

DESCRIPTION OF THE PREFERRED EMBODIMENTS

A first possible embodiment of an infusion apparatus according to the invention will now be described with reference to FIGS. 1 to 3.

Figure 1:
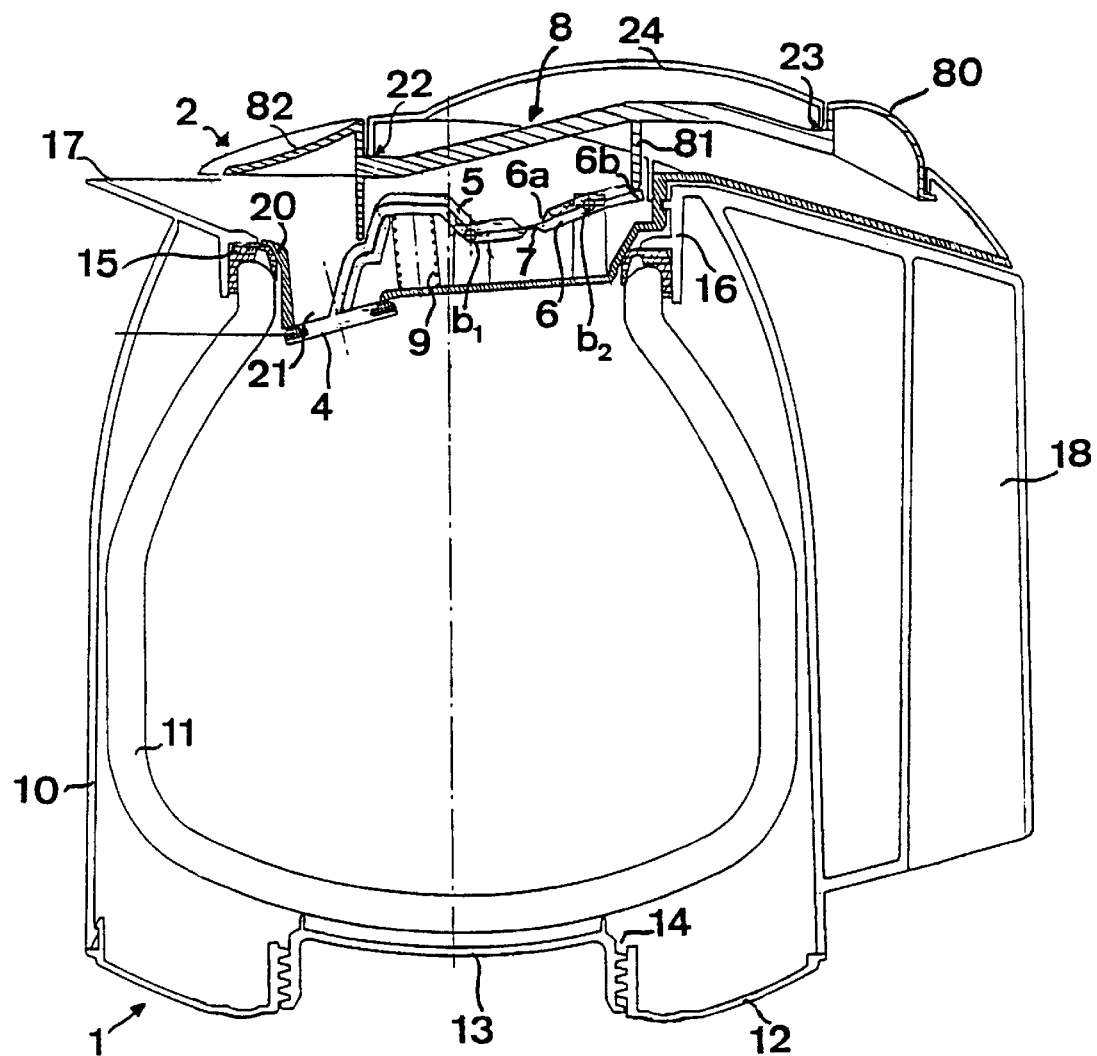
FIG. 1 shows, in longitudinal cross-section, a server in the so-called rest position (open and closed) according to a first possible embodiment of the invention.

The server 1 shown in FIG. 1 by way of non-limiting example, is a server of the insulated type comprising an envelope 10 within which is disposed an isothermal ampoule 11, preferably of glass. The server 1 is delimited in its lower portion by a bottom 12, preferably snapped on the envelope 10. A jack 13, screwed into an opening 14 provided in the bottom 12, permits locking the ampoule 11 against a sealing joint 15 disposed between the envelope 10 of the server and the insulated ampoule 11.

The server 1 moreover comprises a cover 2 whose body 20 is fixed, preferably screwed, on the upper portion 16 of the envelope 10, so as to close the access to the interior of the ampoule. As will be seen in the figures, the cover 2 is provided with an opening 21 for the passage of the infusion, either from the outward opening 30 of an infusion chamber 3 toward the interior of the server (2), or for the removal of the collected infusion (FIG. 3). The opening 21 is preferably located facing a pouring spout 17 of the server 1. A lateral handle 18 is fixed on the envelope 10 of the server, on the side opposite the pouring spout 17.

So as particularly to keep the infusion collected in the server 1 at an optimum temperature, the cover 2 comprises moreover a closure for the opening 21.

In the preferred embodiment, the closure comprises a flap 4 that comes to bear against the edges of the opening 21, from below this opening 21.

The flap 4 is mechanically connected to the cover 2 through the opening 21 by means of first arm 5 mounted pivotally about a first rotation axle $b_1$ carried by the cover 2, and a second arm 6 also mounted pivotally about a second axle $b_2$ carried by the cover. One end 6a of the second arm 6 is connected to the first arm 5 by means of a pivot 7. The second end 6b of the arm 6 is moreover free. The cover 2 comprises preferably resilient means permitting maintaining the flap 4 in the rest position shown in FIG. 1, in which the opening is closed. The elastic means can be constituted, as shown in the figures, by a spring 9 having one end connected to the first arm 5, between the flap 4 and the axle $b_1$, and one end connected to the body 20 of the cover 2.

The arms 5 and 6 as well as the pivot 7 are constituted of a single member of plastic material, the pivot 7 being formed by localized thinning of said member.

Figure 2:
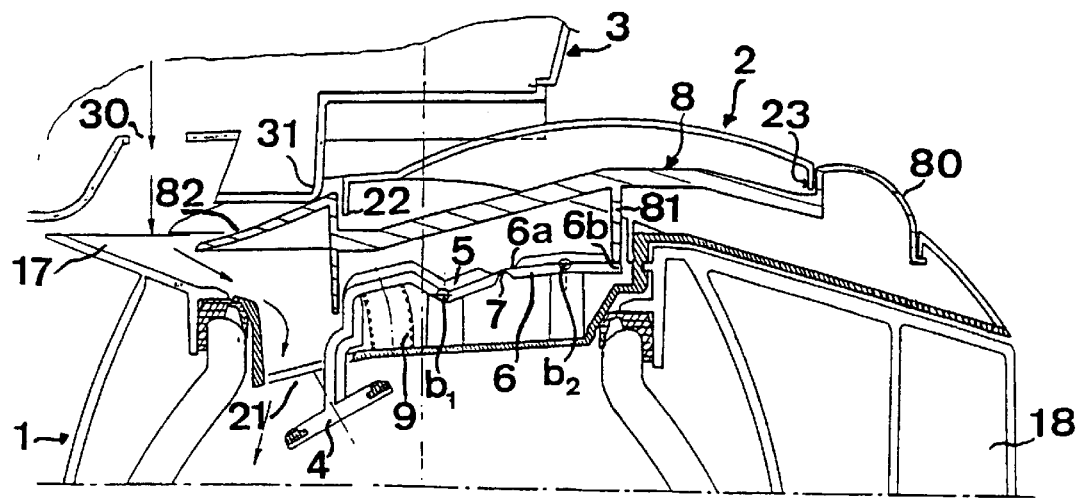
FIG. 2 shows the upper portion of the server of FIG. 1, in longitudinal cross-section, and partially the infusion chamber of the apparatus below which the server is placed for the automatic control mode of the actuating means.

To act on the closure so as to open the opening, the cover 2 comprises moreover, according to the invention, actuating means comprising preferably a single member adapted to being moved either manually or automatically during emplacement of the server below the outlet opening 30 of the infusion chamber 3 (FIG. 2).

In its movement, the member will force the flap 4 away from the opening 21.

Figure 3:
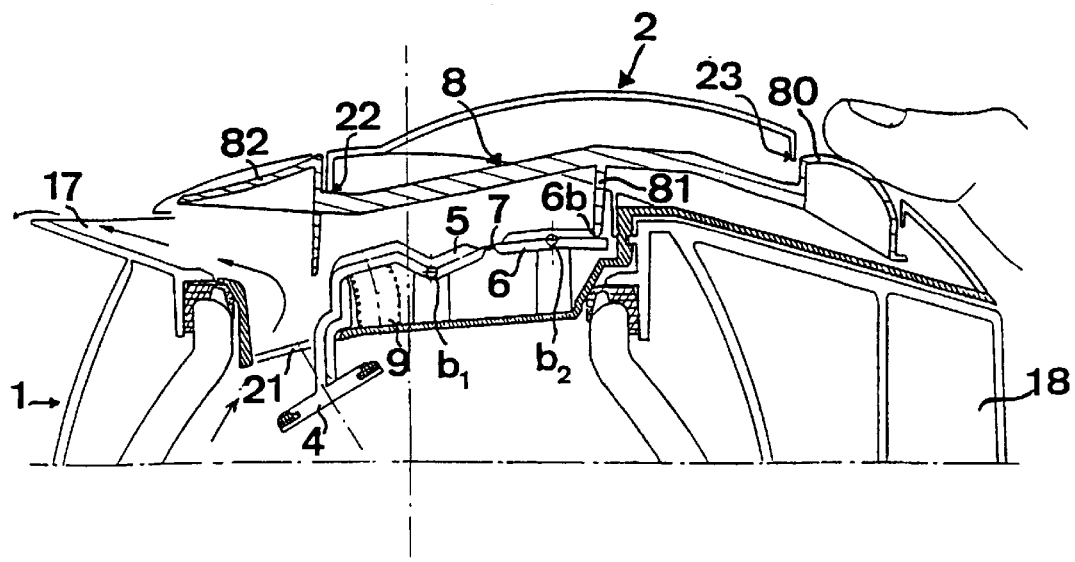
FIG. 3 shows the upper portion of the server of FIG. 1, seen in longitudinal cross-section, and the manual control mode of the actuating means.

The member shown in FIGS. 1 to 3 consists of a lever 8 mounted freely, preferably extending longitudinally between the pouring spout 17 and the handle 18 of the server, above the articulated series comprising the first arm 5 and the second arm 6. The lever 8 comprises a first bearing region 80 for moving it manually, and a second bearing region 82 for moving it automatically. Moreover, the lever comprises a lug 81 located between the two bearing regions 80, 82. This lug 81 extends laterally relative to the longitudinal axis of the lever so as to exert a force on the free end 6b of the second arm 6 upon pressure on either one of the bearing regions 80 or 82.

The cover 2 comprises two abutment points 22, 23 located on opposite sides of the lug 81 and forming alternative pivots for the lever 8 according to whether pressure is exerted on the first or the second bearing region.

In the position shown in FIG. 1, the lever 8 is in contact with the two bearing points 22, 23 under the action of the free end 6b of the arm 6 pressing upwardly on the lug 81, said free end 6b exerting a vertical pressure directed upwardly under the action of the spring 9.

The automatic actuation of the closure takes place, as shown in FIG. 2, by emplacing the server 1 below the outlet opening 30 of the infusion chamber 3 shown only partially. An abutment 31, here located in the lower portion of the infusion chamber, exerts pressure downwardly on the bearing region 82. The lever 8 is spaced from the bearing point 22, but remains in contact with the bearing point 23 about which it pivots slightly. This movement of rotation causes the lug 81 to exert a vertical force on the free end 6b of the arm 6, moving this free end downwardly. The arm 6 accordingly swings about the axle $b_2$ and drives, because of the articulation 7, the arm 5 with the movement of reverse rotation about the axle $b_1$, permitting the flap 4 to move away from the opening 21. The infusion can then flow through the opening 30 into the server 1 through the opening 21, this infusion flow being controlled also by the abutment 31 according to a known device which is not described here.

When the server 1 is withdrawn from the apparatus, the lever 8 automatically returns to the position shown in FIG. 1, thanks to the return spring 9. The opening 21 is then closed by the flap 4, which permits maintaining the collected infusion at a good temperature.

To deliver the collected infusion from the server, the user must exert a pressure, as shown in FIG. 3, on the bearing region 80. In this case, the lever 8 moves away from the bearing point 23, and remains in contact with the bearing point 22. As before, the slight resulting rotation of the lever 8 about the bearing point 22 causes the lug 81 to exert a vertical force on the free end 6b of the arm 6, so as to move the flap 4 away from the opening. By simultaneously inclining the server, the user can dispense the collected infusion through the opening 21.

As can be seen in the drawings, the bearing region 80 for manual activation of the closure is accessible from above the cover 2, and is preferably positioned above and adjacent the lateral handle 18. This permits the user easily to exert a pressure on the bearing region 80 whilst holding, with the same hand, the server 1 by the handle. When the user releases the bearing region 80, the lever 8 returns to its position shown in FIG. 1.

In the embodiment illustrated in FIGS. 1 to 3, the lever 8 is mounted freely within the cover 2, and comes to bear on the two bearing points 22 and 23 of the upper portion 24 of the cover 2 (see FIG. 1). Only the bearing regions 80 and 82 of the lever are accessible from above the cover 2, through openings provided in the upper portion 24 of the cover.

Figure 4:
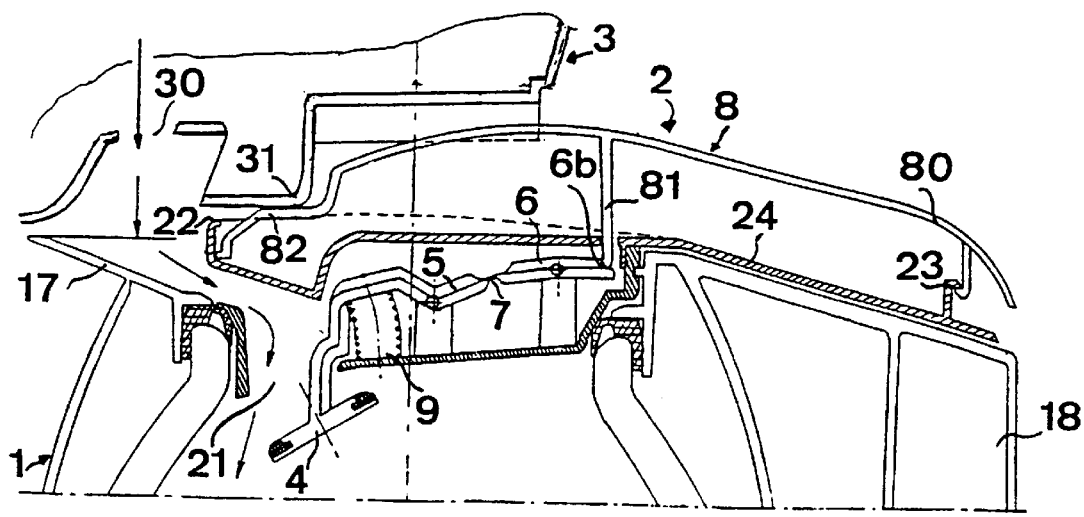
FIGS. 4 and 5 show in cross-section the upper portion of a server according to a second possible embodiment of the invention, respectively in the automatic and in the manual control modes of the actuating means for the closure.
Figure 5:
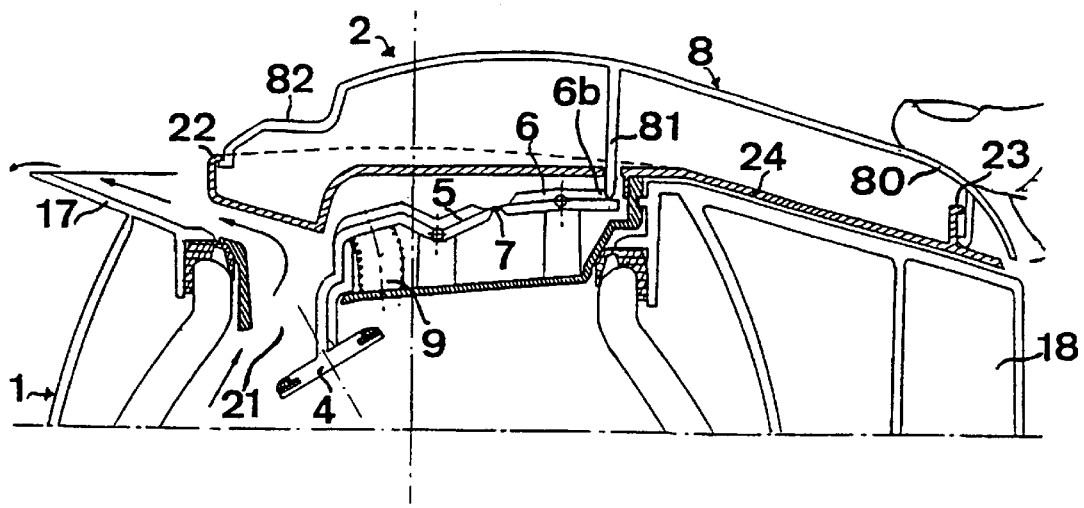

In the modified embodiment shown in FIGS. 4 and 5, the floating lever 8 is mounted on the upper portion 24 of the cover. The lug 81 passes through an opening provided in this upper portion 24, so as to come into engagement with the free end of the arm 6. Two hooks of the lever 8, adapted to be in engagement with the bearing points 22 and 23 of the cover, permit holding the lever 8 on the cover.

Apart from this slight difference in structure of the lever, the operation of the embodiment shown in FIGS. 4 and 5 is in every respect identical to that described with reference to FIGS. 1 to 3.

In a modified embodiment (not shown), the lever 8 could be mounted pivotally about an axle secured to the cover, this axle being disposed between the two bearing regions 80 and 82.

Figure 6:
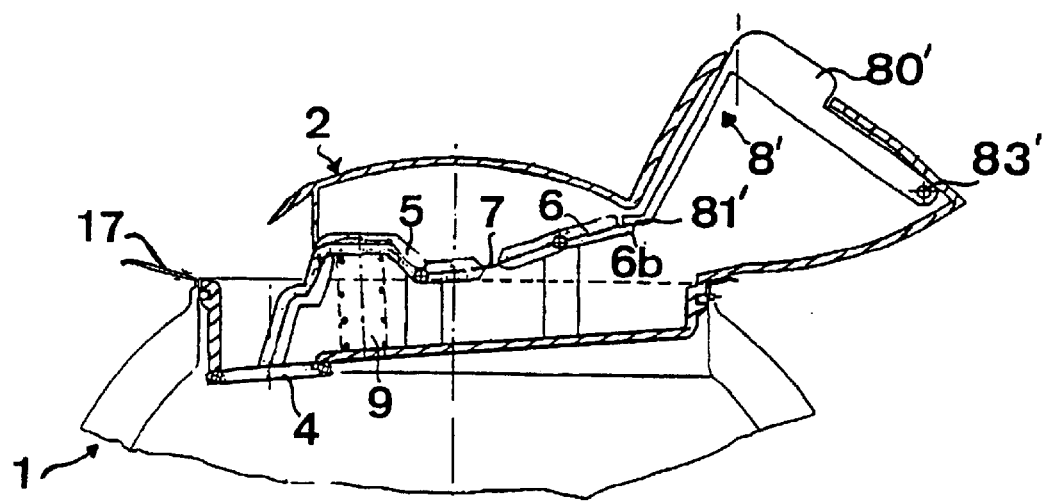
FIGS. 6 and 7 show in cross-section the upper portion of a server according to a third possible embodiment of the invention, respectively in the rest position and in the manual or automatic control position of the actuating means of the closure.
Figure 7:
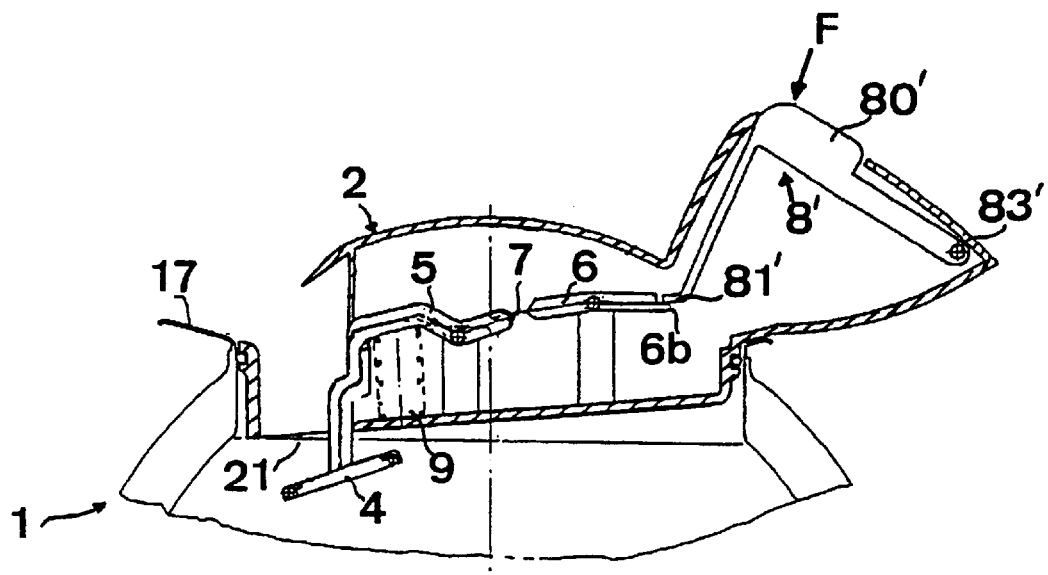

FIGS. 6 and 7 illustrate fragmentarily, in vertical cross-section, a server 1 according to another 5 possible embodiment of the invention, in which the member permitting the actuation of the closure so as to open the opening 21 is constituted by a handle 8' pivotally mounted at one end 83' secured to the cover 2. The other free end 81' of the handle 8' forms the lug coming into engagement with the free end 6b of the arm 6. The handle 8' has a single bearing region 80' to control the closure with a bearing force represented by the arrow F in FIG. 7. This force F results either from manual pressure of the user or from the pressure of an abutment (not shown) secured to the infusion apparatus and disposed preferably on the front surface of the infusion chamber. Under the action of this force F, the handle pivots about its end 83' such that the lug 81' comes to bear against the end 6b of the arm 6, effecting the reverse rotations of the arms 5 and 6 and the movement of the flap 4 away from the opening 21. In the absence of force F, the flap 4 returns to its rest position shown in FIG. 6.

Thanks to the invention, it will be understood that the flap is controlled in a simple and economical manner either manually or automatically, said mechanical members that are used being adapted to be mounted according to another motion transmission system without thereby departing from the scope of the invention.

What is claimed is:

1. An infusion apparatus comprising:
   a collecting server adapted to be placed below an outlet aperture of an infusion chamber; said server having a cover with an opening through which the infusion enters, a pouring spout facing said opening, a closure for said opening for keeping collected infusion at an optimum temperature, and actuating means comprising a single member structured and arranged to automatically open the opening under the action of an abutment secured to the apparatus, upon emplacing the server below the outlet aperture;

said actuating means also adapted to be controlled manually so as to open the opening and permit dispensing of collected infusion from said server through said opening;

said closure comprising a flap disposed within the server below the opening and connected mechanically to the cover via the opening by a first arm mounted pivotally in the cover about a first rotation axle, and by a second arm also mounted pivotally in the cover about a second axle of rotation;

said second arm comprising a first end connected to the first arm by an articulation and a second free end; and said single member comprising at least one first bearing region for manually moving the member, and a lug which exerts, upon movement of said member, a force against the second free end of the second arm so as to impress on said first and second arms two reverse movements of rotation moving the flap away from the opening.

2. The infusion apparatus according to claim 1, wherein the collecting server comprises a lateral handle on the side of the server opposite said pouring spout, said first bearing region being accessible from above the cover and being located above and adjacent said lateral handle so as to permit a user to exert a pressure on said first bearing region whilst holding the server by the handle.

3. The infusion apparatus according to claim 2, wherein the single member comprises a lever mounted floatingly, extending longitudinally between the pouring spout and the handle of the server, above the first and the second arms; the lever comprising on the side of the pouring spout, a second bearing region on which said abutment exerts a pressure upon emplacing the server on the apparatus; and said lug being located between said first and second bearing regions and extending laterally relative to the longitudinal axis of the lever so as to exert said force on the second free end of the second arm upon a pressure on any one of the first or second bearing regions.

4. The infusion apparatus according to claim 3, wherein the cover comprises two abutment points located on opposite sides of the lug and forming alternative pivots for the lever according to whether pressure is exerted on the first or the second bearing region.

5. The infusion apparatus according to claim 1, wherein the abutment is located on the apparatus so as to be able to exert a pressure on said first bearing region upon emplacement of the server below the outlet aperture of the infusion chamber for automatic actuation of the closure.

6. The infusion apparatus according to claim 1, wherein said single member comprises a handle mounted pivotally on one end secured to the cover, and whose free end forms said lug coming into engagement with the second free end of said second arm.

7. The infusion apparatus according to claim 1, wherein the cover comprises resilient means for holding the flap in a rest position in which the opening is closed.

8. The infusion apparatus according to claim 7, wherein said resilient means comprise a spring having a first end connected to the cover, and a second end connected to the first arm, between the flap and the first rotation axle, said spring being compressed upon actuation of the closure to open the opening.

* * * * *